(12) United States Patent
Abramson et al.

(10) Patent No.: US 10,468,050 B2
(45) Date of Patent: Nov. 5, 2019

(54) VOICE SYNTHESIZED PARTICIPATORY RHYMING CHAT BOT

(71) Applicant: Microsoft Technology Licensing, LLC, Redmond, WA (US)

(72) Inventors: Dustin Isaac Abramson, Bellevue, WA (US); Don Edward Diekneite, San Jose, CA (US); Joseph Edwin Johnson, Jr., Seattle, WA (US); Kati Amanda London, New York, NY (US); Brandon Scott Jones, Brooklyn, NY (US); Kevin Michael Munoz, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 15/623,124

(22) Filed: Jun. 14, 2017

(65) Prior Publication Data

US 2018/0286426 A1    Oct. 4, 2018

Related U.S. Application Data

(60) Provisional application No. 62/478,144, filed on Mar. 29, 2017.

(51) Int. Cl.
*G10L 25/51* (2013.01)
*G06F 17/27* (2006.01)
(Continued)

(52) U.S. Cl.
CPC .............. *G10L 25/51* (2013.01); *A63F 13/54* (2014.09); *A63F 13/80* (2014.09); *G06F 17/274* (2013.01); *G10H 1/00* (2013.01); *G10H 1/40* (2013.01); *G10L 15/26* (2013.01); *A63F 2300/6072* (2013.01); *G09B 7/06* (2013.01); *G10H 2210/091* (2013.01); *G10H 2220/011* (2013.01);
(Continued)

(58) Field of Classification Search
CPC ........................................................ G09B 7/06
See application file for complete search history.

(56) References Cited

U.S. PATENT DOCUMENTS 5,248,148 A * 9/1993 Toan ..................... A63F 3/0423
                                                                 273/249
5,283,833 A     2/1994 Church et al.
(Continued)

FOREIGN PATENT DOCUMENTS

CN        101000765 A        7/2007
CN        101399036 A        4/2009

OTHER PUBLICATIONS

"Tune Helper: a program performing speech-to-sing and auto-tuning in MATLAB", http://chenzhe142.github/io/nu-eecs352/abstract.pdf, Published on: Feb. 20, 2016, 3 pages.
(Continued)

*Primary Examiner* — Feng-Tzer Tzeng
(74) *Attorney, Agent, or Firm* — Schwegman Lundberg & Woessner, P.A.

(57) ABSTRACT

Among other things, embodiments of the present disclosure may be used to help train speech recognizers for improving generalized voice experience quality in a chat bot system. In some embodiments, the system provides users with games to play to increase user engagement with the chat bot system.

19 Claims, 3 Drawing Sheets

(51) Int. Cl.
  *G10H 1/00*   (2006.01)
  *G10L 15/26*  (2006.01)
  *A63F 13/80*  (2014.01)
  *A63F 13/54*  (2014.01)
  *G10H 1/40*   (2006.01)
  *G10L 15/02*      (2006.01)
  *G10L 15/22*      (2006.01)
  *G09B 7/06*       (2006.01)

(52) U.S. Cl.
  CPC .. *G10H 2250/455* (2013.01); *G10L 2015/025* (2013.01); *G10L 2015/027* (2013.01); *G10L 2015/221* (2013.01)

(56) References Cited

U.S. PATENT DOCUMENTS

| | | | |
|---|---|---|---|
| 5,651,095 A | 7/1997 | Ogden | |
| 5,806,033 A | 9/1998 | Lyberg | |
| 6,019,372 A * | 2/2000 | Polaski | A63F 3/0423 273/272 |
| 6,726,486 B2 * | 4/2004 | Budra | G09B 5/00 434/167 |
| 7,184,949 B2 * | 2/2007 | Kurzweil | G06F 17/27 704/1 |
| 7,915,511 B2 | 3/2011 | Korst et al. | |
| 2003/0052456 A1 * | 3/2003 | Lasko | A63F 3/00 273/430 |
| 2004/0128130 A1 * | 7/2004 | Rose | G10L 15/02 704/236 |
| 2006/0257840 A1 * | 11/2006 | Risch | G06Q 30/02 434/323 |

OTHER PUBLICATIONS

Pilato, et al., "EHeBby: An evocative humorist chat-bot", In Journal of Mobile Information Systems, vol. 4, Issue 3, Published on: Aug. 2008, pp. 165-181.

Stock, et al., "Getting Serious about the Development of Computational Humor", In Proceedings of the 18th International joint conference on Artificial intelligence, Published on: Aug. 9, 2003, pp. 59-64.

Eric, "Algorithm That Counts Rap Rhymes and Scouts Mad Lines", https://mining4meaning.com/2015/02/13/raplyzer/, Published on: Feb. 21, 2015, 21 pages.

* cited by examiner

| TEXT: | BE- | ING | THIS | NICE | | SHOULD | | BE | | A | | CRIME | | |
|---|---|---|---|---|---|---|---|---|---|---|---|---|---|---|
| BEAT: | 1 | | | 2 | | | | 3 | | | | 4 | | |
| RHYTHM: | ♫ | | ♪ | ♪ | | ♪ | | ♪ | | ♪ | | ♩ | | |

FIG. 3B

| TEXT: | YOU | WAN-NA | REACH | ME | | YOU'LL | | HAVE | | TO | | CLIMB | | |
|---|---|---|---|---|---|---|---|---|---|---|---|---|---|---|
| BEAT: | 1 | | | 2 | | | | 3 | | | | 4 | | |
| RHYTHM: | ♫ | ♪ | ♪ | ♪ | | ♪ | | ♪ | | ♪ | | ♩ | | |

VOICE SYNTHESIZED PARTICIPATORY RHYMING CHAT BOT

CLAIM OF PRIORITY

This application claims the benefit of priority to U.S. Provisional Application Ser. No. 62/478,144, filed on Mar. 29, 2017, and which is incorporated herein by reference in its entirety.

BACKGROUND

"Chat bots" are software applications that conduct conversations with users. Embodiments of the present disclosure are directed generally to a conversational chat bot that can communicate with users interactively using a rhyming synthesized voice.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure may be used to help train speech recognizers for improving generalized voice experience quality in a chat bot system. In some embodiments, the system provides users with games to play to increase user engagement with the chat bot system. The embodiments of the present disclosure may enable other experiences, such as poetry or love letter generation, etc. Embodiments of the disclosure may also enable a chat bot to participate in the music creation process in a social way (e.g., via a social game).

Embodiments of the present disclosure described herein may be implemented using any combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Embodiments of the present disclosure may include, or may operate in conjunction with, various logic, components, modules, and mechanisms. Such components may include any combination of hardware, software, or firmware communicatively coupled to one or more processors in order to carry out the operations described herein. Components may be hardware components, and as such components may be considered tangible entities capable of performing specified operations and may be configured or arranged in a certain manner. For example, circuits may be arranged (e.g., internally or with respect to external entities such as other circuits) in a specified manner as a component. The whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In some exemplary embodiments, software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform the methodologies described herein.

Figure 1:
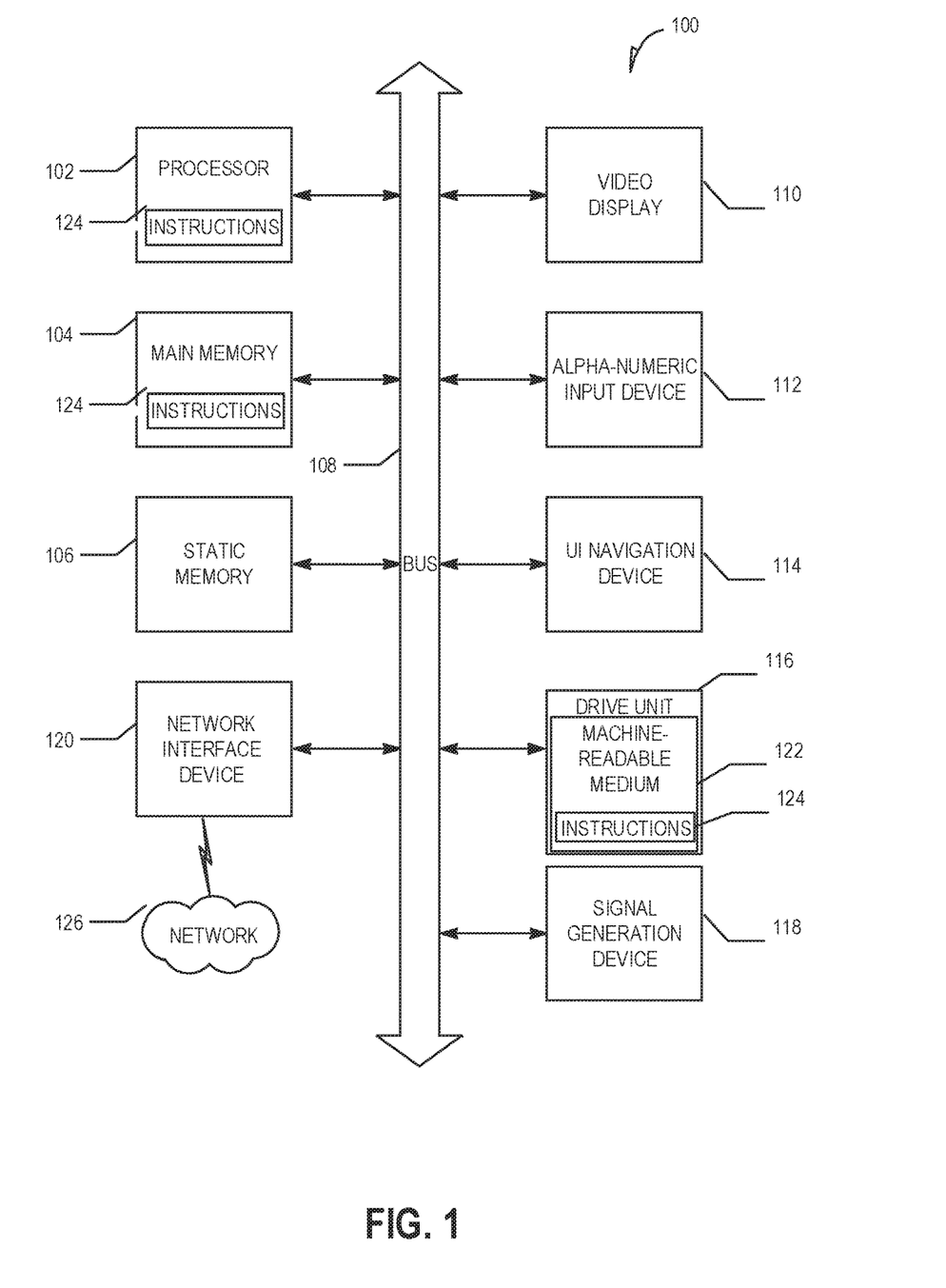
FIG. 1 is a block diagram illustrating an exemplary system according to various aspects of the disclosure.

FIG. 1 is a block diagram illustrating an exemplary embodiment of a computer system 100, within which a set or sequence of instructions may be executed to cause the system to perform any of the functionality discussed herein. In some exemplary embodiments, the system 100 may operate as a standalone device or may be connected (e.g., networked) to other machines. In a networked deployment, the system may operate in the capacity of either a server or a client system in server-client network environments, or it may act as a peer machine in peer-to-peer (or distributed) network environments. The system may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine.

While only a single computer system is illustrated in FIG. 1, the terms "system," "machine," or "device" may include any collection of systems, machines, or devices that individually or jointly perform various functionality of the embodiments of the present disclosure. Similarly, the term "processor-based system" may include any set of one or more machines that are controlled by or operated by a processor (e.g., a computer) to individually or jointly execute instructions to perform any one or more of the methodologies discussed herein.

The exemplary computer system 100 in FIG. 1 includes a processor 102 (e.g., a central processing unit (CPU), a graphics processing unit (GPU) or both, processor cores, compute nodes, etc.), a main memory 104 and a static memory 106, which communicate with each other via a link 108 (e.g., bus). The computer system 100 may further include a video display unit 110, an alphanumeric input device 112 (e.g., a keyboard), and a user interface (UI) navigation device 114 (e.g., a mouse). In one embodiment, the video display unit 110, input device 112 and UI navigation device 114 are incorporated into a touch screen display. The computer system 100 may additionally include a storage device 116 (e.g., a drive unit), a signal generation device 118 (e.g., a speaker), a network interface device 120, and one or more sensors (not shown), such as a global positioning system (GPS) sensor, compass, accelerometer, or other sensor.

The storage device 116 includes a machine-readable medium 122 on which is stored one or more sets of data structures and instructions 124 (e.g., software) embodying or utilized by any one or more of the methodologies or functions described herein. The instructions 124 may also reside, completely or at least partially, within the main memory 104, static memory 106, and/or within the processor 102 during execution thereof by the computer system 100, with the main memory 104, static memory 106, and the processor 102 also constituting machine-readable media.

While the machine-readable medium 122 is illustrated to be a single medium, the term "machine-readable medium" may include a single medium or multiple media (e.g., a centralized or distributed database, and/or associated caches and servers) that store the one or more instructions 124. The term "machine-readable medium" may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" may include, for example, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 124 may be transmitted or received over a communications network 126 using a transmission medium via the network interface device 120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

In various exemplary embodiments of the present disclosure, filters may be used to narrow down a set of items in a repository to a set of items that match a particular set of criteria. For example, when browsing a SharePoint document library, users can use filters associated with column headings to filter documents by their value in the associated column. Additionally, embodiments of the disclosure can provide smart filter suggestions based on the shape of the data a user is currently looking at.

The embodiments of the present disclosure provide a number of advantages and improvements to conventional virtual assistant and chat bot systems. For example, many conventional speech recognizers are prone to error and require a considerable amount of domain-specific and speaker-specific training data. However, such data may take a considerable period of time to gather based on typical user interactions with conventional systems. With embodiments of the present disclosure, by contrast, systems can gather sufficient data in order to power a generalized voice experience relatively quickly, but without burdening the user to engage in boring or unpleasant interactions to provide speech data to the system. Instead, engaging the user in a rhyming game allows the system to gather large amounts of speech data for a user that can be transferred directly to training machine learning algorithms for enhancing the operation and accuracy of the general voice to voice user interactive/conversational chat bot or virtual assistant.

Figure 2:
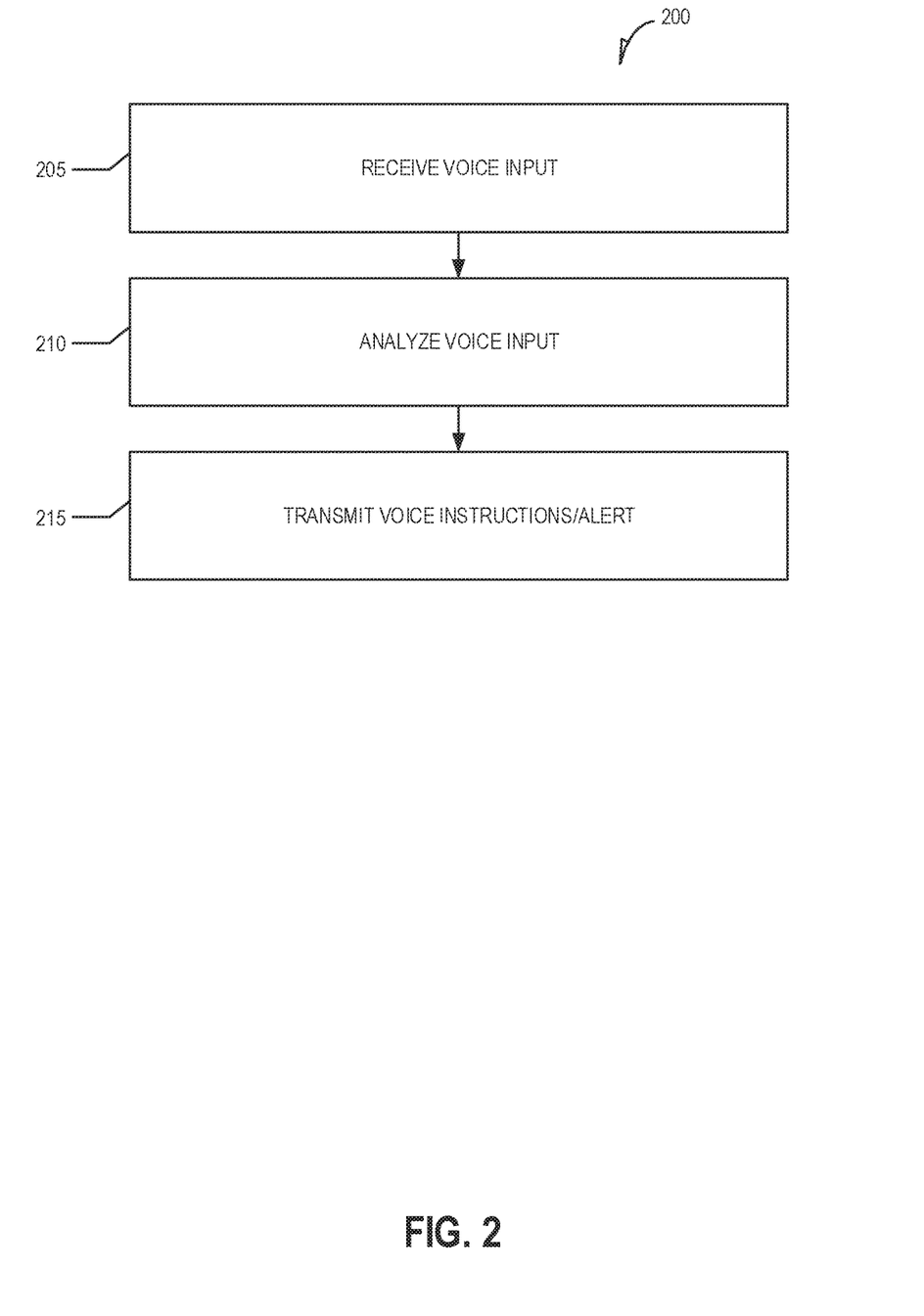
FIG. 2 is a flow diagram illustrating an exemplary method according to various aspects of the disclosure.

FIG. 2 depicts an exemplary process according to various aspects of the present disclosure. In this example, method 200 includes receiving a voice input (205), analyzing the voice input (210), and transmitting voice instructions and/or alerts based on the analysis (215). The steps of method 200 may be performed in whole or in part, may be performed in conjunction each other as well as with some or all of the steps in other methods, and may be performed by any number of different systems, such as the system described in FIG. 1.

Embodiments of the present disclosure can receive (205) a variety of different voice inputs from a variety of different sources. In some embodiments, for example, a server computer system implementing the functionality of method 200 (e.g., computer system 100 shown in FIG. 1) communicates with one or more client computing devices over a network (e.g., network 126) to receive electronic communications containing voice inputs from the respective users of the client computing devices.

Though the present disclosure focuses on inputs from users, and outputs from the system, in a voice format (e.g., a voice recording, synthesized speech, etc.), the system may send and receive content in other formats as well, such as text, video, and images. In this context, an "electronic communication" may include a data packet, text message, email, and/or any other type of electronic communication in any desired format. For example, electronic communications carrying digital recordings of the user's voice inputs (e.g., past recordings, real-time, or near-real-time) may be transmitted within data packets over a network to the server computer system implementing the functionality of method 200.

The system may analyze (210) voice inputs received from a user's computing device for a variety of purposes. For example, the system may await and respond to special triggers given by the user, including signals about whether the user was new to, or had never communicated with, a chat bot hosted by the system. The system may accordingly log the user as a new user and utilize the rhyming feature described herein to introduce the user to the system.

For example, the system may analyze an initial voice input from a user to determine that the user is attempting to initiate communications with the system, such as to interface with a virtual assistant or chat bot hosted by the system. The system may also analyze (210) other voice inputs for other purposes, such as to identify instructions from the user, or to identify data and information contained in the voice inputs. The system may also transmit (215) electronic communications containing instructions, data, alert, and other content to the client computing device of a user or to other systems and devices. Such content may be in any suitable format.

In some exemplary embodiments, the system may receive an electronic communication containing a first voice input (e.g., from a client computing device of a user over a network). For example, the first voice input from the user may invoke a rhyming chat bot application on the system (e.g., "initiate rhyming chat bot").

In response to the first voice input, the system may transmit an electronic communication to the user's computing device containing voice instructions to the user to provide further input. For example, the virtual assistant or chat bot operating on the system may include functionality programmed via one or more software applications (also referred to herein as a "skill" of the virtual assistant or chat bot) for performing an interactive rhyming experience with the user. In such cases, the system may transmit an electronic communication containing instructions to the user to provide a second voice input in accordance with a rhyme scheme.

The system may be adapted to interact with the user with a variety of different rhyme schemes, such as: a perfect rhyme, an imperfect rhyme, an identical rhyme, an eye rhyme, a half rhyme, a multi-syllabic rhyme, a prime rhyme, a pararhyme, and/or an internal rhyme. For example, the instructions to the user to provide the second voice input may provide the user an introduction with an example of a tail rhyme scheme, such as:

"Here's a skill I had, that you didn't know";
"Rhymes with code just like falling snow";
"Rhyme with me, go toe to toe";
"Maybe you can match my glow."

In this example, the rhyme scheme may be referred to as "AAAA," which is a rhyme scheme where each of the four verses has the same tail rhyme. The user, in turn, provides a second voice input where the user tries to rhyme with "glow," "toe," "snow," and/or "know," pitched in the introduction. The user's computing device transmits an electronic communication containing the second voice input from the user to the system, and the system analyzes (210) the second voice input to determine whether the second voice input complies with the rhyme scheme.

Based on whether the user's second voice input complies with the rhyme scheme, the system may either transmit instructions for the user to provide a third voice input (e.g., in the form of another set of lyrics different from the first set that the user again responds to) or an alert that the second voice input does not comply with the rhyme scheme.

For example, if the user responds to the intro above (i.e., the user's second voice input) with: "I'm smart and stealth just like a crow," the system may determine the user's second voice input complies with the rhyme scheme and provide another set of lyrics, such as another plurality of verses (different from the first set) giving an example of the rhyme scheme, such as: "Ok, I heard you show;" "but I drop lines, and I got flow" to prompt the user to provide the third voice input staying with the same rhyme scheme. The process can repeat as many times as desired until the rhyme skill/battle ends (e.g. after some specified number of turns, such as 5 successful turns where the user rhymed correctly).

If, on the other hand, the user's voice input does not comply with the rhyme scheme (e.g., the user tries to rhyme "toe" with "Joseph" instead of "Joe"), then the system may transmit an alert to warn the user that they failed to provide an adequate response in accordance with the rhyme scheme. The user may receive the alert and/or further instructions in a synthesized voice, visually (e.g., in a popup or bubble on the display of the user's computing device), in an image, or any other desired format. For example, if the user's second voice input responds to the intro above with: "this is a fun skill to play, please call me Joseph," the chat bot might provide an alert saying: "your response was a little unordinary"; "Get yourself a rhyming dictionary!" The chat bot then may say "I drop hot lines, and I got flow," giving the user another chance to respond within the rhyming scheme. If the user repeatedly rhymes incorrectly for whatever reason (bad speech recognition or just bad rhymes), the system may exit the skill (e.g., after three wrong attempts).

In some embodiments, the alert may be customized to the user's second voice input to help demonstrate to the user how to comply with the rhyme scheme. For instance, continuing with the example above where the user replies with "this is a fun skill to play, please call me Joseph," the system may analyze the response and search for alternate words with the same/similar meaning, as well as equivalent terms, that could satisfy the rhyme scheme. In this example, the system may determine that "Joe" could be used instead of "Joseph" and indicate (verbally, in text, etc.) to the user suggesting the alternative.

In some embodiments, the system may be adapted to detect and respond to offensive words and phrases, regardless of their suitability within the rhyme scheme. For example, if the user insults the chat bot, flirts with the chat bot, is discriminatory, or otherwise offensive, the chat bot may transmit an alert to the user's computing device include a warning regarding the offensive content. The system may warn the user in non-rhyme (e.g., using the chat bot's regular non-rhyming/non-singing voice). After repeated offensive content from the user, the system may terminate the skill as described below.

In some embodiments, the system may consider user settings in determining content that is offensive. For example, a parent of a child may wish to set (e.g., through a parental controls interface protected by a password) settings to cause the system to warn the user when any offensive language or content is provided by the user. On the other hand, an adult user may remove restrictions on certain words and phrases, or set a level (e.g., low, medium, or high) for warnings against offensive content.

After the rhyme skill has completed (e.g. the user completed the challenge successfully by completing a predetermined number of turns in successful rhyme), or the user did not complete the challenge correctly (e.g. some number of incorrect rhymes), then the system may provide additional instructions to the user to encourage the user to talk to the system a different way (e.g. just normally chat). For example: "as far as rhymes go, those were top shelf. But now why don't you tell me a little about yourself?"; "and P.S. next time you want to rhyme with me, just say 'rhyme with me'."

In some embodiments, the system may employ a rhyming library for use detecting various forms of rhymes from the user, from perfect rhymes (freeze vs breeze) to slant/half rhymes (adios vs coast), using an algorithm described in this brief in the detection of perfect and slant/half rhymes from free-form user input.

The system may utilize various speech recognition systems for identifying voice input from a user (e.g., provided via a microphone on the user's client computing device). Some embodiments may be adapted to translate speech into text (e.g., to be fed into the rhyming library).

The system may include a text to speech synthesis system (TTS) capable of generating spoken speech from free-form written words from any suitable source, including the chat reply index of the chat bot. The system may also generate a pronunciation for any given word in cases where the rhyming dictionary does not have a canonical pronunciation listed for it as a known word.

Embodiments of the present disclosure may include a speech auto-tune system adapted to enhancing the audio produced by the system (e.g., by the TTS) to introduce a rhyming musicality to match the tempo and pitch to a baseline music sample, with the optional addition of background music/tracks to add a rhythm/percussion. In this manner, the instructions provided by the system to the user may be matched to a tempo and/or pitch of a sample of music.

In some embodiments, the system may receive input from the user for controlling various features and aspects of the virtual assistant or chat bot. For example, the user may initiate the rhyming interaction by giving the chat bot one or more rhyming measures, and the chat bot can respond with one or more measures in accordance with the user's input, both related to the subject matter of the user's input, as well as detecting and comporting to the rhyming scheme provided by the user. The user may also instruct the system to share the rhyming interaction on social media with other users.

In some embodiments, the user can provide any part of a rhyme to the system for the system to fill in or complete. The user may also provide (e.g., in the user's voice input) constraints or parameters affecting the instructions provided to the user for providing voice input. For example, the user may define parameters such as the number of syllables in the bar/measure, the rhyme scheme, or even the content of the rhyme such as "give me a rhyme about my favorite tv show Naruto Shippuden."

The following example describes various features of rhyme detection technology that may be used in conjunction with analyzing the voice input from a user. In this example, the system first breaks the user's words up into syllables, where each syllable has an onset and a rhyme (where a rhyme has a nucleus and a coda). Each piece of a syllable is a phoneme (the smallest individual piece of a word that cannot be broken down further, often comprised of a single vowel or consonant sound, or sometimes both [e.g. a voiced consonant]).

The system may be adapted to interact with users in any desired language. In English, for example, each word has either, both, or none of: a primary stress and a secondary stress. Consider, for example, the word "accumulation," which has secondary stress indicated by "," and a primary stress indicated by """ as: accu,mula'tion. It has the following phonemes indicating stress (which the system may discover using a rhyming dictionary, where: 1 indicates primary stress, 2 indicates secondary stress, and 0 indicates no stress: AH0 K Y UW2 M Y AH0 L EY1 SH AH0 N.

Continuing this example, working right to left on a word, the system finds the highest stressed syllable (whether primary or secondary). The rhyming phonemes for this word would be every at and including the right most highest stressed phoneme (EY1), all the way to the end of the word (becoming EY1 SH AH0 N).

The system may repeat the above steps for some other word (e.g. "nation" which rhymes perfectly with accumulation) which has the following phonemes (N EY1 SH AH0 N) and rhyming phonemes which match in the same way (EY1 SH AH0 N). If the phonemes match in this way, the system may consider this word a perfect rhyme.

The system may further employ additional novel techniques for discovering if words are a slant rhyme, which occurs most often in real R&B/hip-hop, rap songs. With regards to slant rhymes, for example, the system may normalize various phonemes of the word to work with the preceding example (e.g. fricative S and Z become equal). Additionally, all plosives (also known as "stops") are considered by the system as equal for the rhyming purpose (p, b, t, k, d, g).

Furthermore, all r-colored vowels and neighboring phonemes that comprise the r-colored vowels are considered equal (ER, AX R, EH R, AO R, IH R, AW R, R) and are normalized to some common r-colored vowel, such as AXR, including any variations introduced by lexical stress (eg. ER1, AO1 R, IH2 R, etc). If one word has a tail plosive (e.g. ends in T) and another word does not, the system may strip away the trailing plosives until both words have a common ending normalized phoneme (such as S). This allows words like "adios" and "coast" to slant rhyme (e.g. AA2 D IY0 OW1 S vs K OW1 S T).

In this exemplary process, the system may determine that two words slant rhyme if they have the same right most stressed vowel and the same normalized tail vowel, ignoring vowels in between (e.g. raps R AE1 P S vs CH AE1 T S) which match on AE1 and S. The system may also allow two words to slant rhyme if they both end on an r-colored vowel, which includes simple 2-syllable multies such as "bleecher" and "screech sir" and "teacher" vs "teach her". The system may also allow two words to slant rhyme that end in co-articulated R colored vowels (e.g. "teach-a" instead of "teacher") of AA, AE, AX, or AXR. If either word ends in either word's rhyming part, while allowing the other word to have different stress on these phonemes, then the system may consider a the words to be a perfect slant/tail rhyme.

In some embodiments, any words the system may not know how to pronounce (e.g., because they are not in the system's rhyming dictionary), the system may generate a pronunciation from a trained TTS model and retrieve the phonemes from the pronunciation model.

In some embodiments, the system may retrieve the pronunciation directly from the audio without first having to convert the voice to text. In some cases, the system may use hidden markov models to discover the (hidden/unknown) phonemes directly from the observed audio, for example where the features are Mel Frequency Cepstral Coefficent (MFCC) vectors, their deltas, and double deltas. In some cases, the system may utilize dynamic time warping to directly compare two MFCC feature vectors between two words, for the tail syllables, to determine if it matches in the ways described above. Among other things, this allows the system to determine rhyming words without the need to recover noisy text, which would need to be converted back to phonemes.

Accordingly, embodiments of the present disclosure help train speech recognizers for improving generalized voice experience quality by giving the user a fun game to play with, as well as increasing engagement with, and discover/ sharing of, a chat bot or virtual assistant. Rhyme technology enables other experiences to be possible as well, such as poetry or love letter generation, etc. Embodiments of the present disclosure also enables a chat bot to participate in the music creation process in a social way via the novel rhyming game described herein.

In some embodiments, a user may use a push-to-talk button (e.g., a hardware button or via a software user interface) to send the system voice input. In other embodiments, the system may employ a multi-turn experience without having to push buttons, or a two-way conversational experience (e.g., full duplex). Also the embodiments of the present disclosure are not limited to voice (e.g. this can work just as well in a text experience, where we can reply back in auto-tuned voice, regular voice, text, image, or video).

In some embodiments, the system may support "rap battles" rather than turn by turn interactions. In some cases, the chat bot may let the user rhyme on their own for some number of turns (e.g. a verse) and then the chat bot jumps in. The verse of the user can be enforced to be in the style of the chatbot's own rhyming/lyrical style, or it can alternate in some way (e.g., the user does AAAA, chatbot does BBBB, etc), or the user or chatbot pitches what scheme they want, and the opponent must follow it to the best of their ability. In some embodiments, the system may relax enforcement of following the rhyming scheme such that just having a rap battle with enough rhyming quality (e.g., the number of words that rhyme, the number of lines that rhyme, how dense the rhymes are, fewer than a maximum number of words in between rhyming words) may be deemed acceptable by the system to continue the interaction.

As noted above, the system may operate in conjunction with a variety of different rhyme schemes, meters, and rhyme types (e.g., internals, multis). For example, in addition to the AAAA scheme the system may utilize ABAB or ABBA rhyme schemes, as well as others. In a particular example, Edgar Alan Poe's rhyme scheme from "The Raven" is shown below using an ABCBBB rhyme scheme:

Line 1: Once upon a midnight dreary, while I pondered, weak and weary, A;
Line 2: Over many a quaint and curious volume of forgotten lore—B;
Line 3: While I nodded, nearly napping, suddenly there came a tapping, C;
Line 4: As of some one gently rapping, rapping at my chamber door—B;
Line 5: "Tis some visitor," I muttered, "tapping at my chamber door"—B;
Line 6: "Only this and nothing more."—B.

In some embodiments, the system may utilize and enforce a particular meter in the rhyme. For example, Edgar Allen Poe's "The Raven" poem above uses trochaic octameter, where "trochaic" means a STRESSED syllable followed by unstressed (contrast this with Shakespeare's "iambic" which means unstressed then STRESSED), and where "octameter" means 8 feet per line of verse and each trochaic di-syllable pair is one foot:

ONCE uPON a MIDnight DREARy, WHILE I PONdered, WEAK and
\* -\* -\* -\* -\* -\* -\*
WEARy.
\* -

In the example above, the "\*" symbol indicates a stressed syllable, and "-" indicates an unstressed syllable. The alternation between stressed and unstressed forms the beat, where the stressed syllable is on the beat and unstressed syllable is off the beat. Other kinds of feet include dactyl (STRESSED unstressed unstressed), which is a tri-syllabic rhyme [meaning three syllables per foot], and anapestic (e.g., Dr Seuss's "The Cat in the Hat" used a rhyme called "anapestic tetrameter," which is similar to Shakespeare's iambic but it has an extra unstressed syllable at the beginning (e.g. unstressed unstressed STRESSED).

In some embodiments, the system may measure whether the user's input stays in meter to the chat bot's own meter, or if the user's input stays in meter to whatever meter the user happens to pick. The system may further measure for how long the user stays in meter. In some cases, the system may require that the user stay in meter a minimum percentage of the time (e.g. 80% of the syllables of the user's verse have to stay in meter) in order to continue the interaction without generating an alert.

Embodiments of the present disclosure may operate in conjunction with internal rhymes, which have words internal (not just at the tail end) in one bar/line rhyming with words internal to the next line of a rhyme scheme. So in the case of Edgar Allan Poe's "The Raven" (shown again below), there are internal rhymes that may not even be bound by the rules of the rhyme scheme, and where there is "napping" on the C line in the scheme rapping with "rapping" in the B line of the scheme, even though "lore" and "door" are the rhyming words between the two B lines here:

Line 1: Once upon a midnight dreary, while I pondered, weak and weary, A;
Line 2: Over many a quaint and curious volume of forgotten lore—B;
Line 3: While I nodded, nearly napping, suddenly there came a tapping, C;
Line 4: As of some one gently rapping, rapping at my chamber door—B.

In some embodiments, the system detects internal rhymes by finding all nearby rhyming words and then determining a rhyme score based on how many words perfectly rhyme or slant rhyme. This score may be affected based on the number of words in between them (e.g., closer rhymes get higher scores, and farther rhymes get lower scores). In some embodiments, the system determines whether the rhyme score exceeds a predetermined threshold. For example, if the user achieves a score of 300 points or better, the user may continue with the interaction. In another example, the user is required to beat chatbot's own rhyming score to continue. In yet other cases, the system may normalize the score (e.g., between 0 and 1) by calibrating against the rhymes of all known user rhyme sessions (e.g., (userscore−globalmin)/(globalmax−globalmin)), where the average score or above is deemed as "passing." The rhyming score can also be calibrated with some placeholder data from testing until the system has enough data to compute these average, min, and max scores.

The system may also be adapted to operate in conjunction with multi-syllabic rhymes or "multis," which include a group of syllables connecting multiple words with a corresponding group of syllables connecting the same or different words in the next line. Multi's don't have to be internal (but they often are), and sometimes occur at the end of a rhyme like tail rhymes, but they are slant rhyming, such as:

a tasty juicy ORANGE served on top of PORRIDGE;
replace the pantry DOOR HINGE and on our quest we FORAGE.

In the example above, we have "O" and "R" and "NGE" and even "GE" style phoneme chains constituting the multi's. Embodiments of the present disclosure may detect multi-syllabic rhymes by measuring distance between phonemes (rather than just words themselves). Additionally, the system may identify multi's by using probability (e.g. syllables rhyme with some probability, such as 50%, based on the surrounding context) rather than enforce that only some syllable rhymes with another syllable. For example, the vowels in the words "and" and "in" can contribute to the rhyming sound of a verse if there are rhyming words next to them or internal to a line or pair of lines, such as "to here and there and in we go", where "ere" "nd" "n" would all contribute to the score with some probability. The probabilities of rhymes can be computed offline using machine learning (e.g., using a markov chain).

Embodiments of the present disclosure may also operate in conjunction with holorhymes, which are multis where every (or almost every) syllable in the previous line rhymes with every (or almost every) syllable in the next line. In other words, holorhymes are multis where the distance between rhyming syllables is close to 0. For example:

"Poor old Dali loped with an amazin' raging cyst, as poor Roald Dahl eloped with Anna-May's enraging sisters."

In the above example, the writer "crosses the bar" between "as" and "poor" (meaning the line of verse carries over from one bar to the next).

The system may operate with "prime rhymes" (e.g., "bruise crews" or "funny money") which are sets of words that make sense together and also rhyme together. In some cases the leading consonants may not match, such as with "harbor barber" and "shady lady".

The system may also operate with para rhymes such as "red rod" or "hall" and "hell". Basically the primary stressed syllable doesn't have to rhyme, but the beginning and ending syllables usually do. The system can measure para rhymes using a score based and/or rule-based rhyme detection strategy, such as discussed previously.

Figure 3A:
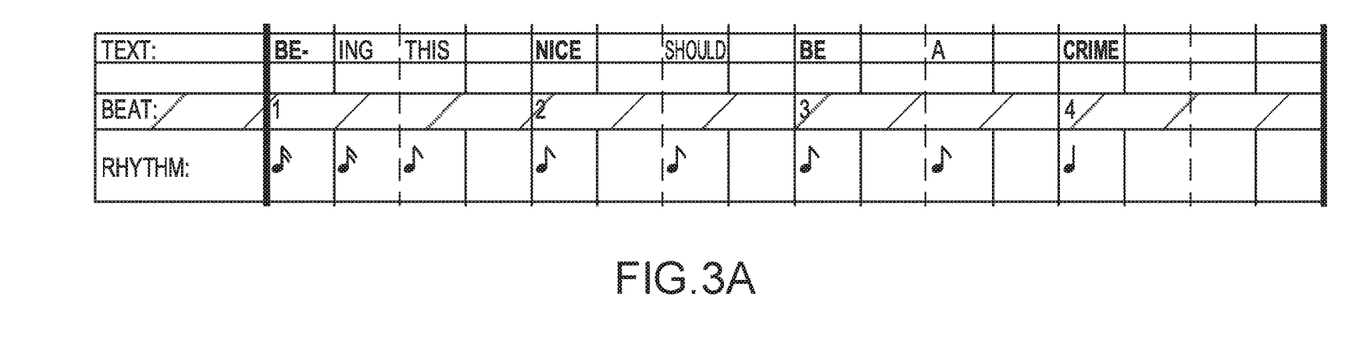
FIGS. 3A and 3B illustrate various aspects of the method in FIG. 2.
Figure 3B:
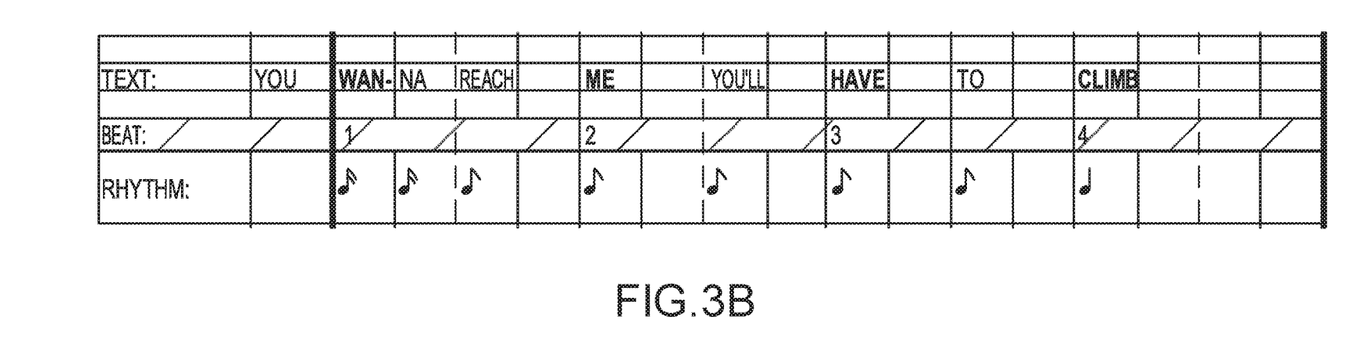

FIGS. 3A and 3B illustrate aspects of an exemplary rhyming system according to various embodiments of the present disclosure. As used below, the term "beat" refers to an equal and steady pulse (division of time), while "tempo" refers to how fast or slow beats occur (as measured in beats per minute), and "meter" refers to a repeating pattern of accented and non-accented beats. One iteration of a pattern is called a "measure."

In this example, the rhyming scenarios depicted in FIGS. 3A and 3B involve rhythmic speech by aligning words and syllables with musical beats according to tempo and meter. Further, stressed syllables and words align with the appropriately accented beats while non-stressed syllables and words fall either on weak beats (non-accented beats) or in between beats on various sub-divisions of the beat, depending on word/syllable stresses.

Overall, the interactive experience includes a 4-measure intro followed by several 1-measure prompts, and ending with a 2-measure outro. If the user misses a rhyme at any point in any of the turn iterations, a 2-measure outro will play encouraging the user to try again.

The rhyming scheme in this example includes a 1-measure (4-beat) prompt from the TTS voice. The final word usually falls on beat 4 and it is the one that the user must rhyme. For example, in the prompt, "Being this nice should be a crime," the user must rhyme the word crime. The rhyming system aligns this prompt rhythmically as shown in FIG. 3A, with stressed words/syllables in bold.

After hearing this prompt (also referred to above as the instructions to the user to provide voice input), the user responds by making up their own rhyme such as, "I'm so nice I'll give you my time." The system receives (205) this voice input response (e.g., via electronic communication from the user's computing device), analyzes the response (210), and determining the response matches with the rhyming scheme of the prompt, generates and transmits the next prompt continues by starting the next turn with, "You wanna reach me, you'll have to climb," depicted in FIG. 3B.

Even though these two phrases are similar, the actual rhythm of the speech is driven by which syllables need to fall on which beats. In this case, the word "you" occurs before the first beat. In musical terms, this is called a "pickup."

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Where a phrase similar to "at least one of A, B, or C," "at least one of A, B, and C," "one or more A, B, or C," or "one or more of A, B, and C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:

a processor; and memory coupled to the processor and storing instructions that, when executed by the processor, cause the system to perform operations comprising:

receiving, over a network from a computing device of a user, an electronic communication containing a first voice input from the user;

in response to the first voice input, transmitting, over the network to the computing device of the user, an electronic communication containing voice instructions to the user to provide a second voice input in accordance with a rhyme scheme, wherein the voice instructions to the user to provide the second voice input are matched to one or more of: a tempo of a sample of music, or a pitch of the sample of music;

receiving, over the network from the computing device of the user, an electronic communication containing the second voice input from the user;

analyzing the second voice input to determine whether the second voice input complies with the rhyme scheme; and transmitting an electronic communication, over the network to the computing device of the user, an electronic communication containing either:

voice instructions to the user to provide a third voice input in accordance with the rhyme scheme, in the event the second voice input complies with the rhyme scheme; or a voice alert that the second voice input does not comply with the rhyme scheme, in the event the second voice input does not comply with the rhyme scheme.

2. The system of claim 1, wherein the voice instructions to the user to provide the second voice input in accordance with the rhyme scheme include an example of the rhyme scheme.

3. The system of claim 2, wherein the example of the rhyme scheme comprises a first plurality of verses, and wherein each verse in the first plurality of verses complies with the rhyme scheme.

4. The system of claim 2, wherein the voice instructions to the user to provide the third voice input in accordance with the rhyme scheme includes an example of the rhyme scheme comprising a second plurality of verses, wherein the first plurality of verses is different from the second plurality of verses, and wherein each verse in the second plurality of verses complies with the rhyme scheme.

5. The system of claim 1, wherein the alert includes an indication that the user's second voice input failed to comply with the rhyme scheme and further instructions customized to the user's second voice input for complying with the rhyme scheme.

6. The system of claim 1, wherein analyzing the second voice input includes determining the second voice input includes offensive content, and wherein the alert includes a warning regarding the offensive content.

7. The system of claim 1, wherein the rhyme scheme includes one or more of: a perfect rhyme, an imperfect rhyme, an identical rhyme, an eye rhyme, a half rhyme, a multi-syllabic rhyme, a prime rhyme, a pararhyme, and an internal rhyme.

8. The system of claim 1, wherein first voice input from the user includes parameters for the instructions to the user to provide the second voice input, the parameters including one or more of: a number of syllables for a measure of lyrics, the rhyme scheme, and subject matter for the second voice input.

9. The system of claim 1, wherein analyzing the second voice input includes identifying one or more syllables for each word in the second voice input, and identifying one or more phonemes for each identified syllable.

10. The system of claim 9, wherein analyzing the second voice input further includes identifying a level of stress for each identified phoneme.

11. The system of claim 10, wherein determining whether the second voice input complies with the rhyme scheme is based on the identified level of stress for each identified phoneme.

12. The system of claim 9, wherein the rhyme scheme is a slant rhyme scheme, and wherein analyzing the second voice input includes normalizing a phoneme from the one or more phonemes in a word from the second voice input and normalizing a vowel within the normalized phoneme.

13. The system of claim 12, wherein analyzing the second voice input includes normalizing vowels from the word within the second voice input.

14. The system of claim 12, wherein analyzing the second voice input includes stripping trailing plosives from the word within the second voice input.

15. The system of claim 14, wherein determining whether the second voice input complies with the rhyme scheme is based on the normalized vowels.

16. The system of claim 1, wherein analyzing the second voice input includes analyzing words within the second voice input without first converting the second voice input to text.

17. The system of claim 1, wherein analyzing the second voice input includes generating and comparing Mel Frequency Cepstral Coefficent vectors based on the second voice input.

18. A computer-implemented method comprising:
receiving, by a computer system over a network from a computing device of a user, an electronic communication containing a first voice input from the user;
in response to the first voice input, transmitting, by the computer system over the network to the computing device of the user, an electronic communication containing voice instructions to the user to provide a second voice input in accordance with a rhyme scheme, wherein the voice instructions to the user to provide the second voice input are matched to one or more of: a tempo of a sample of music, or a pitch of the sample of music;
receiving, by the computer system over the network from the computing device of the user, an electronic communication containing the second voice input from the user;
analyzing, by the computer system, the second voice input to determine whether the second voice input complies with the rhyme scheme; and
transmitting, by the computer system, an electronic communication, over the network to the computing device of the user, an electronic communication containing either:
voice instructions to the user to provide a third voice input in accordance with the rhyme scheme, in the event the second voice input complies with the rhyme scheme; or
a voice alert that the second voice input does not comply with the rhyme scheme, in the event the second voice input does not comply with the rhyme scheme.

19. A non-transitory computer-readable medium storing instructions that, when executed by a computer system, cause the computer system to perform operations comprising:
receiving, over a network from a computing device of a user, an electronic communication containing a first voice input from the user;
in response to the first voice input, transmitting, over the network to the computing device of the user, an electronic communication containing voice instructions to the user to provide a second voice input in accordance with a rhyme scheme, wherein the voice instructions to the user to provide the second voice input are matched to one or more of: a tempo of a sample of music, or a pitch of the sample of music;
receiving, over the network from the computing device of the user, an electronic communication containing the second voice input from the user;
analyzing the second voice input to determine whether the second voice input complies with the rhyme scheme; and
transmitting an electronic communication, over the network to the computing device of the user, an electronic communication containing either:
voice instructions to the user to provide a third voice input in accordance with the rhyme scheme, in the event the second voice input complies with the rhyme scheme; or a voice alert that the second voice input does not comply with the rhyme scheme, in the event the second voice input does not comply with the rhyme scheme.

\* \* \* \* \*